(Model.)
T. J. MAYALL.
Means for Closing the Opening in India-Rubber Bottles, &c.
No. 228,207.
Patented June 1, 1880.
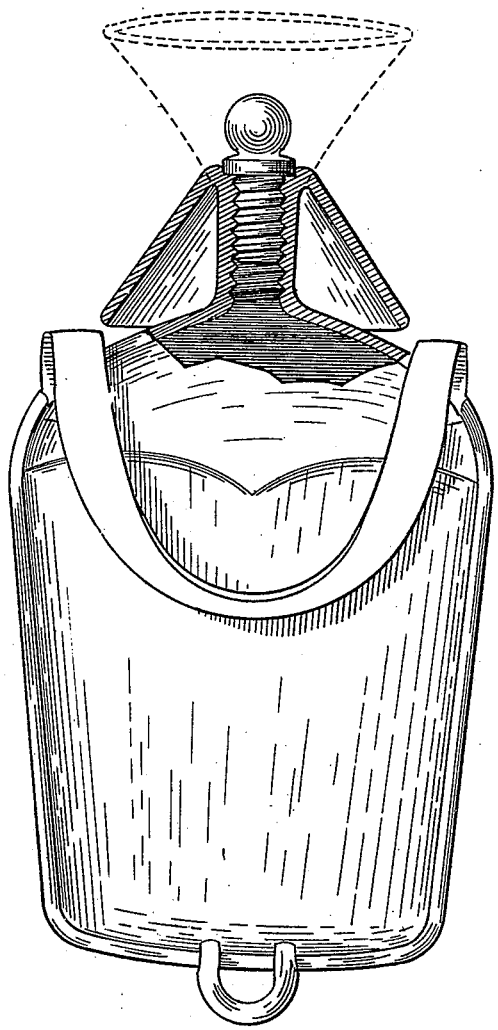

UNITED STATES PATENT OFFICE.

THOMAS J. MAYALL, OF READING, MASSACHUSETTS.

MEANS FOR CLOSING THE OPENING IN INDIA-RUBBER BOTTLES, &c.

SPECIFICATION forming part of Letters Patent No. 228,207, dated June 1, 1880.

Application filed April 15, 1880. (Model.)

*To all whom it may concern:*

Be it known that I, THOMAS J. MAYALL, of Reading, Massachusetts, have invented a new and useful Improvement in the Means for Closing the Opening in India-Rubber Bottles and other similar articles made of india-rubber, such as life-preservers, air-cushions, syringes, &c., of which the following is a specification.

My invention relates to the form, materials of, and construction of the neck or opening of an india-rubber bottle or other similar article made of india-rubber, and of a plug or stopple for closing such opening. These articles are made of what is commonly known as "soft vulcanized rubber," and are flexible, with more or less elasticity.

Heretofore in making india-rubber bottles and other similar articles of india-rubber in which there is an opening to be closed tightly when the article is in use, the practice has been to insert in the rubber neck or opening a tube or bushing of metal, with a screw-thread either on the inside to receive a screw-plug or on the outside to be covered with a cap with a screw-thread on the inside of it.

This manner of closing such openings is very imperfect and objectionable in many particulars, especially as it is difficult to join the rubber and the metal securely together, and the tendency of the parts to become loose in consequence of the softness of the metal generally used making the joint liable to become leaky and imperfect.

In my invention I make the neck or opening in the india-rubber bottle or other similar article wholly of rubber, without any metallic tube or bushing, and of considerable thickness, molding the rubber, when it is in a plastic state prepared for vulcanizing, upon a screw, and vulcanizing it with the screw in it; and I mold the plug or stopple, also of india-rubber in a plastic state prepared for vulcanizing, in a mold with a screw-thread in it, so made as to give the plug or stopple a size and form that will exactly fill the neck or opening it is to close, and into which it is entered by turning it around and running the screw-thread on it into the screw-thread in the inside of the neck or opening to be closed, and I vulcanize it in the mold.

Thus I provide a safe, secure, and durable means of closing the opening into an india-rubber bottle, life-preserver, air-cushion, syringe, or other similar articles of rubber-manufacture by making the opening and the plug to close it both of india-rubber vulcanized, with a screw-thread on each to match a screw-thread on the other, so that they may be screwed together.

Thus the opening is closed exactly tight and the plug cannot fall out or become loosened so as to leak, and neither the plug nor the opening is liable to wear by use so as to become insecure, and it is more durable and economical than the metallic bushings and screws heretofore in general use for the purposes specified.

I would observe, however, that heretofore a stopper with a solid core surrounded by soft rubber in which a screw-thread is formed has been used in connection with a corresponding internal screw of hard material, or at least such use has been suggested as a convenient means for closing ink-bottles and similar articles; and it has also been proposed to use a stopper with screw-thread formed of hard material in connection with a collar secured on the inside of the bottle-neck and provided with an internal elastic screw-thread. In this invention both the external screw-thread of the stopper and internal thread of the mouth are formed of soft rubber, and are yielding, so that the parts of the joint fit more closely, and there is not the liability of the joint to become leaky by breaking or chipping, as when the screw is formed of hard material, wood, vulcanite, glass, &c. Moreover, the mouth or neck of the water-bag or other article, with its screw-thread, is formed integral with the body of the article, which is not the case when a rubber lining is applied to the neck of a bottle of glass or similar material. The stopper is preferably formed solid, with an outside circular or annular shoulder at or above the upper part of the screw-thread.

It is obvious that the male and female parts of the joint may be so reversed as to have a screw-thread on the outside of the neck of a bottle, and instead of a plug a cap made to screw on over the end of the neck, and thus securely close the opening.

I also adapt this invention to the joining of the several parts of india-rubber syringes and other similar articles of rubber-manufacture, which have heretofore been joined by metallic pieces screwed together, thus producing greater security and durability at less cost.

The drawing annexed shows a vertical sectional view of the neck of a bottle with the plug screwed into its place in it.

I claim as new and my invention—

1. An india-rubber bottle or similar article having the neck or opening provided with an elastic screw-thread of soft rubber vulcanized thereon, in combination with a stopper or plug having a corresponding elastic screw-thread, substantially as described.

2. An india-rubber bottle or similar article of soft rubber, having a neck formed integral therewith and provided with an elastic screw-thread vulcanized on the inside of said neck, substantially as described.

3. A solid plug or stopper formed of soft rubber, with a screw-thread and a circular or annular shoulder vulcanized thereon, substantially as described.

THOS. J. MAYALL.

Witnesses:
 CHS. HOUGHTON,
 FRED L. HOUGHTON.